L. F. CORRODI.
FILM FEEDING MECHANISM FOR CAMERAS.
APPLICATION FILED JUNE 29, 1915.
1,236,271. Patented Aug. 7, 1917.
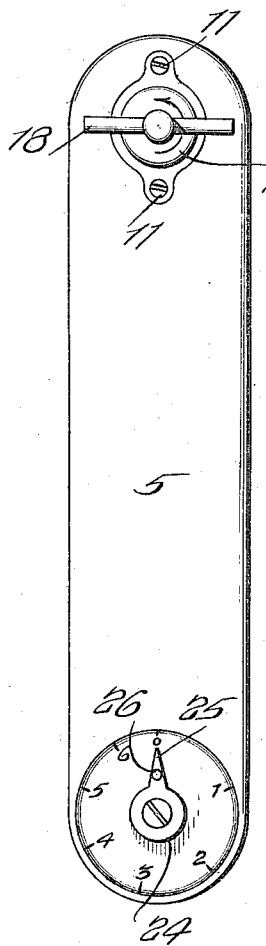
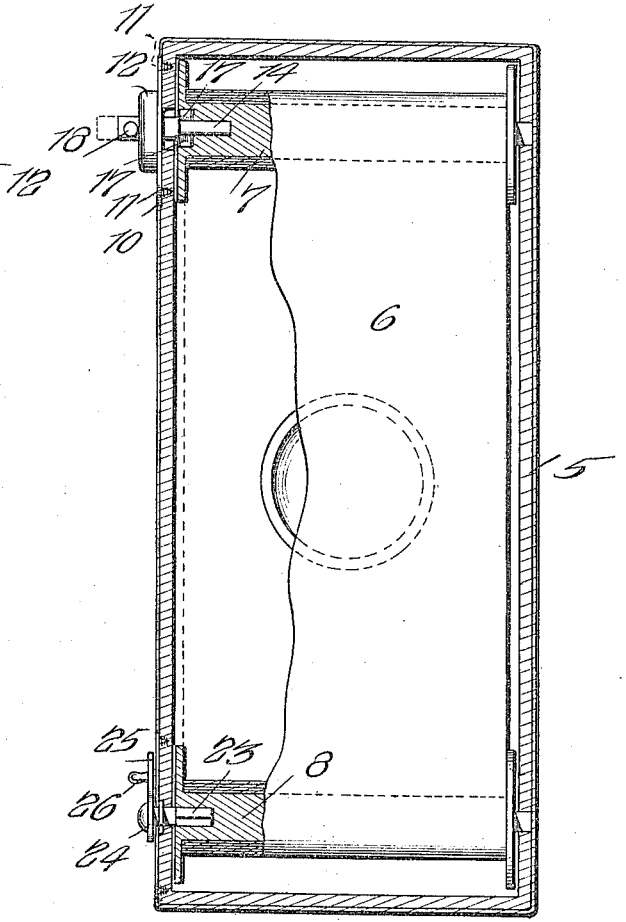
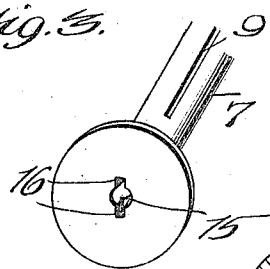
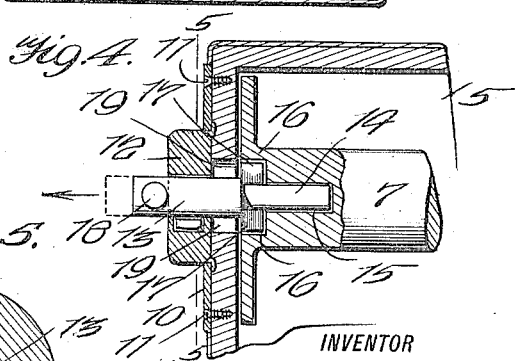
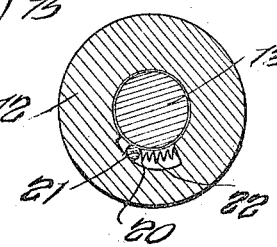
WITNESSES:
INVENTOR
LOUIS F. CORRODI,
BY Munn & Co.
ATTORNEYS

UNITED STATES PATENT OFFICE.

LOUIS FRANK CORRODI, OF ABBEVILLE, LOUISIANA.

FILM-FEEDING MECHANISM FOR CAMERAS.

1,236,271. Specification of Letters Patent. Patented Aug. 7, 1917.

Application filed June 29, 1915. Serial No. 37,018.

*To all whom it may concern:*

Be it known that I, LOUIS F. CORRODI, a citizen of the United States, and a resident of Abbeville, in the parish of Vermilion and State of Louisiana, have invented an Improvement in Film-Feeding Mechanism for Cameras, of which the following is a specification.

This invention is an improvement in cameras, and has particular reference to a novel construction of film feeding mechanism.

Feeding mechanisms now in common usage employ, in connection therewith, a sight opening in the casing of the camera through which a number on the film is visible, said number indicating that the film is in position for the next exposure. This method is faulty in that oftentimes the film is unwound too much, by reason of carelessness or inability to observe the number through the opening, thus resulting in a defective exposure as there is no means for rewinding the film to adjust it to proper position.

The present invention overcomes the above objection by providing a take-up device, detachably connected to the take-up roller or spool, which may be rotated in one direction to wind the film upon said roller and which is adapted to be positively locked against rotation in an opposite direction so that when a portion of a film is brought into position for an exposure any rewinding movement upon the feed roller, when the take-up device is in normal position, is impossible.

An indicator is also provided on the exterior of the camera which is operated by the take-up device, to rotate in one direction, when the film is being wound upon the take-up roller and which may be rotated in the opposite direction should the film be accidentally unwound too much for a proper exposure. In order to permit of the indicator being rotated in the opposite direction and enable the film to be rewound upon the feed roller, the take-up device used in connection with the invention is made longitudinally adjustable relative to the take-up roller so that it may be disconnected therefrom.

The construction contemplated by this invention is simple, inexpensive to manufacture, durable and effective in use.

The inventive idea involved is capable of receiving a variety of mechanical expressions, one of which, for the purpose of illustrating the invention, is shown in the accompanying drawing, in which—

Figure 1 is an edge elevation of a camera showing the take-up and indicator devices applied thereto.

Fig. 2 is a fragmentary vertical longitudinal sectional view taken through the camera.

Fig. 3 is a fragmentary detail perspective of one end of the take-up roller used in connection with the invention.

Fig. 4 is a fragmentary enlarged sectional view of the take-up device.

Fig. 5 is a section on the line 5—5 of Fig. 4.

Referring more particularly to the drawing, the numeral 5 indicates a camera casing, which may be of any preferred construction and which is adapted to have the film 6 mounted therein in a manner to be described.

A take-up roller 7 generally of ordinary construction is rotatably mounted at one end of the casing 5 while the feeding roller 8 is rotatably mounted in the other end thereof, said take-up roller 7 being provided with a longitudinal slot 9 therein for the reception of the end of the film carried by the roller 8 when the camera is being loaded. A take-up mechanism is associated with the roller 7 and comprises a base-plate 10 adapted to be secured to the camera by means of fasteners 11. The plate 10 has extending outwardly therefrom a small journal box or bearing 12 adapted to have passed therethrough a shaft 13 which also passes through a central opening formed in the plate 11. The inner end of the shaft 13 is provided with a reduced extension 14 which projects into a longitudinal opening 15 formed in the adjacent end of the roller 7 whereby said end is at all times supported in proper position within the casing 5. The end of the roller 7 having the opening 15 therein is also provided with oppositely disposed cavities 16 which communicate with said opening, said cavities being adapted to receive oppositely disposed wings 17 carried by the extension 14 adjacent the main portion of the shaft 13. A small handle 18 extends transversely through the outer end of the shaft 13 and is adapted to rotate said shaft in the direction of the arrow in Fig. 1, whereby to impart a similar movement to the roller 7 when the wings 17 are in engagement with the cavities 16. The shaft 13 is adjustable longitudinally relative to the roller 7, for a purpose which will appear in the course of the description, and in order to accomplish this adjustment the casing 5 of the camera is provided with an opening 19 which is of such diameter as to readily receive the wings 17 when the shaft is pulled out to the dotted line position shown in Figs. 2 and 4. When in this position the extension 14 still supports the end of the roller 7 and any manipulation of the handle 18 will have no effect upon said roller.

Means are also provided in connection with the take-up device for positively preventing rotation of the shaft 13 in any other direction than that indicated by the arrow in Fig. 1. This construction is for the purpose of retaining any portion of the film 6 in proper position for an exposure as long as the take-up device is in clutching engagement with the roller 7. Means for accomplishing this purpose includes a channel 20 formed in the bearing 12 contiguous to the shaft 13, said channel being of greater depth at one end than at the other. A small roller 21 is mounted in the channel and is normally retained in position adjacent the shallow end of the channel by means of small coil springs 22. This construction will permit of the shaft 13 being rotated in the direction of the arrow as such rotation will have a tendency to cause the roller 21 to move to the deeper end of the channel 20. Should it be attempted to rotate the shaft in the opposite direction the frictional engagement of the shaft 13 with the roller 21 will jam the latter in the shallow end of the channel, which will result in a binding action of the shaft and thus prevent rotation thereof.

One end of the feed roller 8 is journaled upon the stub shaft 23 which is squared upon its inner end, as shown, said shaft being journaled in the casing 5 and having an indicating hand 24 mounted upon its outer end, which indicating hand coöperates with a dial 25 secured to the outer face of the casing 5. As the take-up device is actuated the indicating hand 24 is rotated through the medium of its connection with the roller 8 and indicates, by means of the numbers on the dial, when the film is in position for an exposure. Should the operator accidentally cause the film to be taken up too much upon the roller 7 so that it would be impossible to secure a proper exposure, the film may be rewound upon the roller 8 by first withdrawing the wings 17 from engagement with the roller 7, as previously described, whereby said roller will be free to rotate in a direction opposite to that of the arrow in Fig. 1. The small knob 26 formed upon the indicating hand 24 may then be grasped and said hand rotated in a direction to rewind the film upon the roller 8 until the same is brought to a proper position, whereupon the shaft 13 is again moved inwardly so as to cause the wings 17 to clutch with the roller 7.

I claim:

1. In a camera, the combination with feed and take-up rollers, and a film adapted to be unwound from and rewound upon said feed roller; of a take-up device movable longitudinally of said take-up roller and including clutching means movable into driving engagement with the latter roller for winding the film thereon and movable out of engagement with said roller to permit rotation thereof in an unwinding direction, said take-up device also including a projection for supporting said take-up roller when the clutching means is out of engagement therewith, means for preventing rotation of said take-up roller in one direction when the clutching means is in engagement therewith, and means for rewinding the film upon said feed roller when the clutching means of the take-up device is out of engagement with said take-up roller.

2. In a camera, the combination of feed and take-up rollers, a take-up device including clutching means movable into and out of engagement with said take-up roller and also including a projection for supporting said take-up roller when the clutching means is out of engagement therewith, means for permitting rotation of said take-up roller in one direction only when the clutching means is in engagement therewith, and means for rewinding a film on said feed roller when said clutching means is out of engagement with said take-up roller.

3. In a camera, the combination with a casing having an opening therein, feed and take-up rollers mounted in said casing, the latter roller being in substantial alinement with the opening in the casing and having cavities in one end, and a film adapted to be unwound from and rewound upon said feed roller; of a bearing secured to and engaging said casing contiguous to the opening therein, a take-up device including clutching means and movable into and out of engagement with the cavities in said take-up roller, said device also including a projection for supporting said take-up roller when the clutching means is out of engagement therewith, said take-up roller being rotatable in one direction only when the clutching means is in engagement therewith and rotatable in either direction when said clutching means is out of engagement therewith, means mounted in said bearing and engaging said take-up device for preventing rotation thereof in one direction when said clutching means is either in or out of engagement with said take-up roller, and means for rewinding the film upon said feed roller when the clutching means of the take-up device is out of engagement with said take-up roller.

4. In a roll film camera, the combination with a winding roll, of a shaft in line with said roll, one of said members having a cylindrical male member having a non-cylindrical portion, and the other having a cylindrical bore and corresponding non-cylindrical aperture, said shaft being movable into driving engagement with the roll for winding the film thereon and movable out of driving engagement with said roll to permit said roll to rotate independently thereof, said shaft also including a projection for supporting said roll when said shaft is out of driving engagement therewith.

LOUIS FRANK CORRODI.

Witnesses:
 Rom. T. Lees,
 R. J. La Bauve.

Copies of this patent may be obtained for five cents each, by addressing the "Commissioner of Patents, Washington, D. C."